United States Patent

MacKenzie et al.

[11] 4,087,775
[45] May 2, 1978

[54] MOUNTING FOR AN RTD ELEMENT

[75] Inventors: Douglas J. MacKenzie, Park Ridge; Dennis C. Johnson, Hoffman Estates, both of Ill.

[73] Assignee: ARi Industries, Inc., Franklin Park, Ill.

[21] Appl. No.: 716,366

[22] Filed: Aug. 23, 1976

[51] Int. Cl.² .............................................. H01C 3/04
[52] U.S. Cl. ........................................ 338/28; 29/612; 29/613; 29/619; 338/243
[58] Field of Search .................. 338/28, 22, 23, 24, 338/25, 229, 238, 243, 252; 73/362 AR, 359, 362 SC; 29/612, 613, 614, 619

[56] References Cited

U.S. PATENT DOCUMENTS

| 2,379,317 | 6/1945 | Picciano | 338/28 |
| 3,267,733 | 8/1966 | Chambers | 73/362 AR |
| 3,896,409 | 7/1975 | Micheli et al. | 338/28 |
| 4,011,654 | 3/1977 | Beaudoin | 29/612 |

Primary Examiner—C. L. Albritton
Attorney, Agent, or Firm—Leonard S. Knox

[57] ABSTRACT

A temperature measuring probe utilizing an RTD element and an improved mode of assembling the element in a reliable manner which is proof against shock and vibration. Specifically, the invention has its most important applications in connection with miniaturized RTD's.

5 Claims, 5 Drawing Figures

MOUNTING FOR AN RTD ELEMENT

BACKGROUND AND SUMMARY OF THE INVENTION

RTD elements are frequently mounted in a metallic sheath of very small diameter. In the prior art, a typical mode is to locate the device within a sheath, say stainless steel, and to obtain rigidity by surrounding the device with a highly compacted mass of some particulate refractory, say, MgO. One common type of RTD capsule comprises a resistance in the form of a conductor helically wound on an insulating mandrel and the embedment of the winding in a glass or ceramic insulant which, when viscous, fuses with the mandrel. Since numerous applications prescribe the utmost possible accuracy in conversion of temperature to voltage, every precaution is taken to avoid the effects of vibration and shock by immobilizing the element. Prior practice frequently overlooked the possibility of damage resulting from compacting the MgO and careless handling.

The present invention relates to an improved RTD probe and the method of fabricating the same. The improved method disclosed herein decreases the cost and increases reliability, while eliminating problems encountered with prior methods, e.g. wherein an RTD element is joined to two or more conductors carried in the sheath while these latter are exposed for access; in such methods the element and joints are subsequently enclosed by a metal sleeve which is then joined to the metallic sheath of the probe, and a powdered refractory is then packed between the sheath and elements therewithin. The present invention eliminates the problems of these prior practices.

DESCRIPTION OF THE PREFERRED EMBODIMENT

Figure 1:
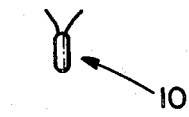
FIG. 1 is a side elevational view of a typical RTD, approximately full size.
Figure 2:
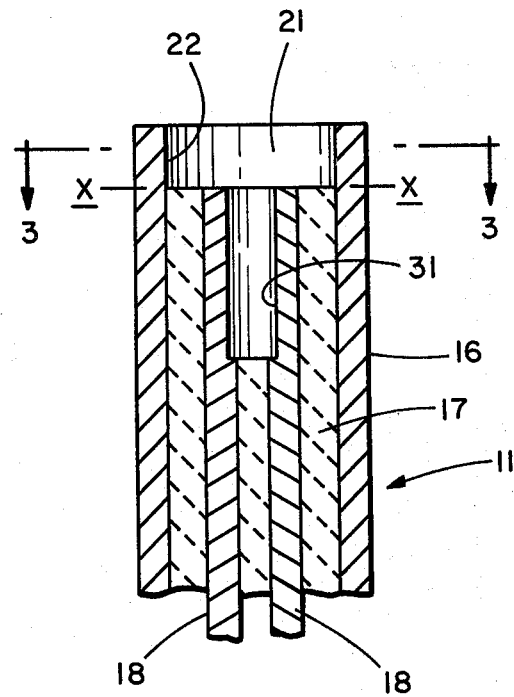
FIG. 2 is a vertical, medial, magnified, partial cross section of a probe prepared to receive the element.
Figure 3:
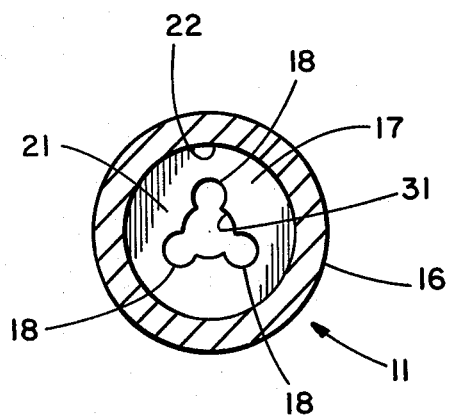
FIG. 3 is a cross section taken on the line 3—3 of FIG. 2.

In a preferred form of the invention we employ a commercial RTD element indicated at 10, comprising a solid, insulating mandrel upon which a helical winding (not shown) of suitable resistance wire is wound. The winding is encased in glass fused in place or fired ceramic and the terminal ends 14 of each winding are brought out for connection to a suitable circuit. A representative probe 11 incorporating the principles of the invention will comprise a metallic sheath 16, e.g. stainless steel, within which the element 10 is supported in a manner to be described.

The conductors 18 (in the example, three in number) by which the terminal leads 14 of the element are connected to the circuitry (not shown) in which the element plays its part are, in accordance with common practice, supported and insulated with respect to the sheath 16 and each other, by means of a firmly compacted mass 19 of a pulverized refractory, e.g. MgO. Conductors 18 may number two or more.

In accordance with the invention the leads 18 and refractory are leveled adjacent one end of the sheath, as by counterboring, for example, to the plane X—X, to provide a chamber 21 to house the connections between the terminal leads of the RTD element and its conductors 18. It is to be noted that this chamber 21 has an interior portion of the sheath as its lateral wall 22.

A bore 31 is drilled on the axis of the sheath of such length and diameter as to receive the RTD element with a comfortable fit yet loose enough to allow placement of an adequate layer of cement. Prior to insertion of the element, it is coated with a ceramic cement, such as Sauereisen No. 8 or equivalent. At this point it is important not to impose strain on the element in order to avoid fracture. The cement referred to is available from Sauereisen Cement Co., Pittsburgh, Pennsylvania.

After insertion of the RTD element into the bore and curing of the ceramic cement, the three exemplificative conductors 18 of the probe are welded to the terminal leads of the respective RTD's.

Figure 5:
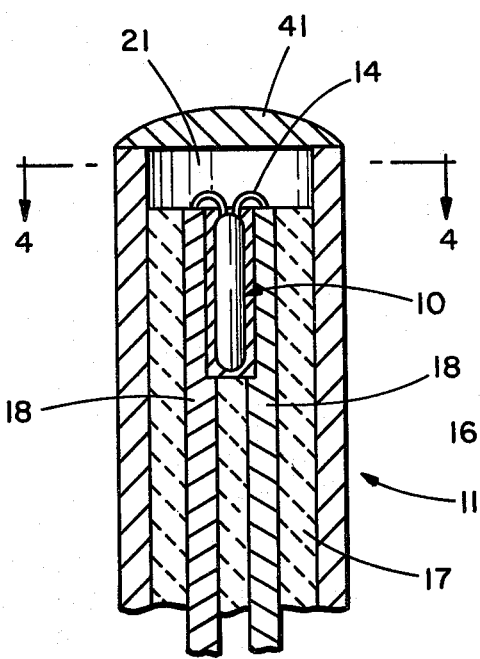
FIG. 5 is a cross section similar to that of FIG. 2 but showing the completed assembly.
Figure 4:
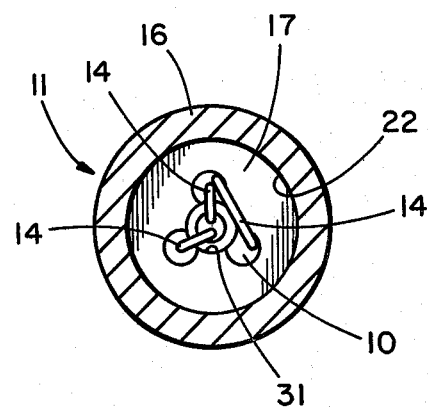
FIG. 4 is a cross section taken on the line 4—4 of FIG. 5.

In the example, a jumper (FIG. 4) is shown connected between two of the three cable wires. However, since the electrical circuitry, per se, forms no part of the invention, elaboration is deemed unnecessary. The chamber 21 is then filled with Sauereisen No. 8 cement which is then cured to integrate the electrical connections with the insulation. The cement is trimmed to a level calculated to avoid interference with a closure cap 41, in the form of a simple disc or plug which is welded to the end of the sheath 16 (FIG. 5).

It will be understood that the total length of the probe will be as required an that its connection to the temperature indicating or controlling means will be conventional.

In order to provide better understanding of the magnitude of the probe and its milieu, a typical RTD element may be essentially the shape of a medicinal capsule, having a diameter of about 3 mm and a length of about 30 mm.

We claim:

1. A temperature sensing probe including a resistance-temperature device (RTD), said device having a pair of terminal leads to be connected in a circuit for translating variations in resistance of the circuit into usable information, said probe comprising a tubular metal sheath extruded over compacted refractory powder insulation to surround and electrically insulate extruded conductors, a bore in one end of the material, the device being received in the bore and retained therein by means of a refractory substance, the end of the sheath extending outwardly beyond the insulating material to define a chamber within the sheath, the said conductors being joined to said leads within said chamber, a refractory substance filling said chamber, and means for closing said chamber at the outer end thereof.

2. A temperature probe including a resistancetemperature devise and two or more terminal leads associated therewith (RTD) mounted in a tubular sheath comprising: a plurality of electrical conductors contained in the sheath, a tightly compacted mass of refractory, electrically-insulating, comminuted particles in said sheath separating and rigidly supporting said conductors, the mass of particles and the conductors terminating adjacent one end of the sheath on a plane which is substantially perpendicular to the axis of the sheath, said plane being inward of the extreme end of the sheath, said plane and the interior of the sheath defining a chamber at the end of the sheath, a bore extending inwardly of said plane, the transverse extent of the bore being greater than the transverse extent of the RTD element to define a space therebetween, the RTD element being received in said bore with its leads extending into the chamber, said leads being joined to said conductors, cement, rigid when cured, in the voids intermediate the RTD element and bore and means closing said one end of the sheath.

3. The method of manufacturing a temperature probe of the type in which a resistance-temperature devise (RTD) having terminal leads is employed for translating variations in temperature into electrical signals and which device is supported in a fixed position in a tubular sheath and a refractory, electrically-insulating material separates and insulates the leads from the sheath, comprising the steps of
  (a) providing a tubular sheath and electrical conductors supported therein;
  (b) trimming one end of the sheath and material substantially square with respect to the axis of the sheath;
  (c) removing the material and conductors for an end portion of the length thereof to define a chamber having a floor transversely of the axis;
  (d) boring a hole in said floor, the diameter of said bore being such as to receive the RTD element with a loose fit;
  (e) placing the resistance-temperature device in said bore with the terminal leads thereof extending into said chamber;
  (f) filling the voids between the bore and resistance-temperature device with a refractory cement;
  (g) curing the cement;
  (h) joining the leads to associated conductors;
  (i) filling the remaining voids with a refractory cement;
  (j) closing the chamber by securing a closure to the sheath.

4. The method of incorporating a resistance-temperature device (RTD) as part of a sheathed temperature device (RTD) as part of a sheathed temperature probe, the device having a plurality of conductors exiting from the sheath to connect the RTD element to circuit means, comprising the steps of:
  (a) providing a tubular sheath having said conductors therein and compacted electrically-insulating refractory material separating and insulating the conductors from the sheath and each other;
  (b) removing the conductors and material adjacent one end of the sheath to define a chamber having a floor at said one end;
  (c) boring into said floor to provide a hole having a diameter and length to accommodate the RTD element with clearance as to avoid strain thereon;
  (d) placing the element in said bore with its terminal leads outermost;
  (e) depositing cement in the voids between the element and whole;
  (f) curing the cement;
  (g) joining the RTD element leads to the conductors in a predetermined circuit arrangement;
  (h) filling the chamber with refractory, electrically insulating cement;
  (i) curing said cement; and
  (j) attaching a closure to the open end of the sheath to close the chamber.

5. The method of assembling an element for translating temperature into an electrical signal, said element having leads to enable the element to be connected to conductors forming part of a circuit comprising the steps of:
  (a) providing a tubular sheath;
  (b) positioning the conductors in said sheath, axially thereof, spaced from the sheath and each other, the conductors, at least at one end thereof terminating adjacent in adjacent end of the sheath;
  (c) filling the sheath with a particulate, refractory substance;
  (d) tightly compacting said substance while maintaining the conductors and sheath in spaced relation;
  (e) cutting one end of the sheath, conductors and substance transversely to the axis;
  (f) removing the substance and conductors at said one end, while leaving the sheath undisturbed, to define a chamber at said one end, said chamber having a floor transversely of the axis;
  (g) boring a hole in the floor of the chamber of dimensions to freely receive the element with its leads accessible in the chamber and extending thereout of;
  (h) filling the voids between the hole and element with cement;
  (i) fusing the element leads to respective ones of said conductors; and
  (j) securing a cover over the chamber to enclose the same.

* * * * *